James Rees: Steam Engine Piston Head.

116353

PATENTED JUN 27 1871

Witnesses:
R. C. Kenshall
James P. Kay

Inventor:
James Rees.
by Bakewell, Christy & Kerr,
his Attys.

UNITED STATES PATENT OFFICE.

JAMES REES, OF PITTSBURG, PENNSYLVANIA.

IMPROVEMENT IN STEAM-ENGINE PISTON-HEADS.

Specification forming part of Letters Patent No. 116,353, dated June 27, 1871.

*To all whom it may concern:*

Be it known that I, JAMES REES, of Pittsburg, in the county of Allegheny and State of Pennsylvania, have invented a new and useful Improvement in Steam-Engine Piston-Head; and I do hereby declare the following to be a full, clear, and exact description thereof, reference being had to the accompanying drawing making a part of this specification, in which—

Figure 1:
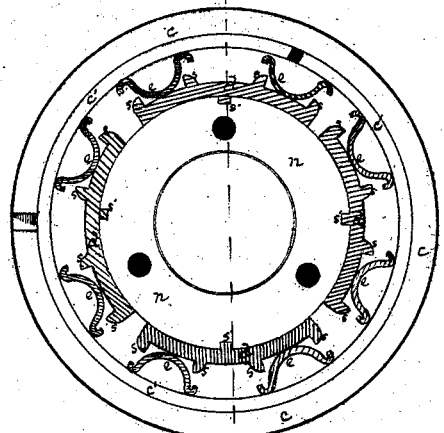
Figure 3:
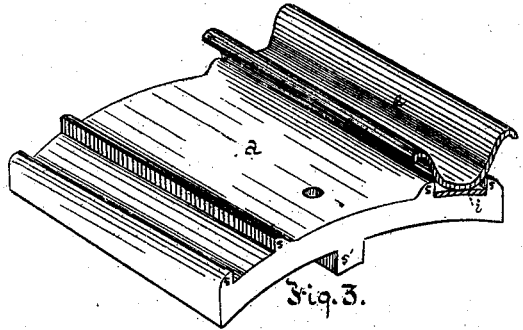
Figure 2:
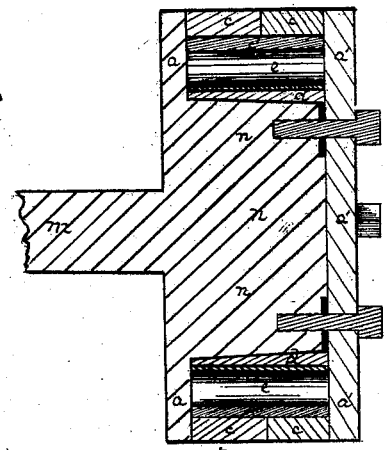
Figure 4:
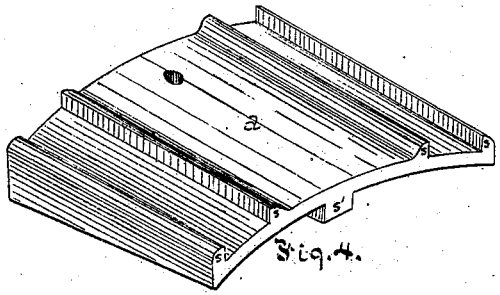

Figure 1 is an end view of the inside of a steam-piston, the follower being removed. Fig. 2 is a sectional view through the piston in the line $x\ x$, Fig. 1; and Figs. 3 and 4 are detached views, in perspective, of one of my improved expanding-plates, with a spring in position.

Like letters of reference indicate like parts in each.

For the purpose of securing a steam-tight joint between a piston and its cylinder, packing-rings are used of such construction that they can be expanded outward against the inner face of the cylinder. To effect this springs are introduced between the piston-head and the rings, and pressure-screws are arranged to bear against these springs so as to force them outward to any required extent.

My invention relates to an improvement in devices for forcing out or expanding the packing-rings; and consists in combining with a tapering piston-head a series of expanding-plates of a corresponding but a reversed taper, such plates having a series of seats for the springs. These seats are bounded laterally by longitudinal ribs, so that thin metallic plates can be inserted in the seats under the springs to force the springs out as the outer faces of the packing-rings become worn.

To enable others skilled in the art to make and use my improvement, I will proceed to describe its construction and mode of operation.

I adopt the usual or any known suitable construction in making the piston-stem $m$, the end plates $a\ a'$, the packing-rings $c\ c$, the expanding-rings $c'\ c'$, springs $e$, and piston-head $n$, except the device last named is made slightly tapering toward its outer end. I then make a series of curved plates, $d$, the curvature of the inner face of the plates corresponding to the curvature of the outer face or the head $n$. These plates $d$ are a little the thickest at the outer end, the difference in thickness between the two ends being equal or about equal to the amount of taper of the head $n$. The plates $d$ are held, each in its proper place, by ribs $s'$, which enter corresponding grooves in face of the head $n$. On the outer faces of each plate $d$ are two or more ribs, $s$, arranged in pairs at suitable distances apart, so that each pair of ribs $s$ shall furnish a seat for the convex face of one of the springs $e$.

It will now be observed that, when the springs are in place, the plates $d$, when forced into position by an endwise movement, will, on account of their wedge-like form, act as wedges in causing the springs $e$ to bear or press outwardly against the expanding-rings $c'\ c'$, and also that the wedge-like form of the plates $d$, combined with the taper form of the head $n$, causes the springs $e$ to bear, with a uniform pressure through their entire length, against the expanding-rings $c'$.

As the outer faces of the packing-rings $c\ c$ wear off I expand them outward to the required extent by introducing under each spring $e$, and in the seat made by the ribs $s$, a thin sheet-metal strip or plate, $i$, the thickness of such plate being regulated by the amount of expansion desired in the packing-rings $c\ c$.

The plates $d$ can be made separately—one for each spring—or in sections of proper length for two or more springs to each plate.

What I claim as my invention, and desire to secure by Letters Patent, is—

1. A piston-head, $n$, of taper form, combined with a series of wedge-shaped plates, the inclination of the plates corresponding with the taper of the head; and also a series of springs, $e$, arranged between the plates $d$ and the packing-rings, substantially as described.

2. The wedge-shaped plates $d$, each having one or more seats, formed by ribs $s$, in which to seat the springs $e$, substantially as described.

In testimony whereof I, the said JAMES REES, have hereunto set my hand.

JAMES REES.

Witnesses:
JNO. A. STRAIN,
JAMES I. KAY.